UNITED STATES PATENT OFFICE.

MELVIN B. CHURCH, OF GRAND RAPIDS, MICHIGAN.

ENAMEL SURFACE FOR CARRIAGES AND THE LIKE.

SPECIFICATION forming part of Letters Patent No. 373,014, dated November 8, 1887.

Application filed April 1, 1887. Serial No. 233,288. (No specimens.)

*To all whom it may concern:*

Be it known that I, MELVIN B. CHURCH, of Grand Rapids, in the county of Kent and State of Michigan, have invented a new and useful Improvement in Processes for Coating Surfaces; and do hereby declare that the following is a full, clear, and exact description of the same.

The invention set forth in the following specification is an improved process devised by me for covering any exposed surfaces, and as a substitute for any of the ordinary paint and oil finishing for such surfaces. The objects sought to be accomplished are to secure a better and more durable covering and finish, to lessen the time required ordinarily in putting on the various coats, and also to reduce the cost. This improved covering is adapted to surfaces exposed to the weather—such as those of carriages, cars, and other vehicles—to houses, and, as a matter of course, to furniture or any indoor surfaces.

The essential part, though not the whole, of my present invention consists in applying directly to the surface of wood or other material which is to be covered a coating consisting of a mixture of finely-ground calcined gypsum and glue, the whole suspended in water and reduced to a proper condition to be applied with a brush, and in putting directly upon this, when dry, an outer coating of oil or varnish.

Heretofore and prior to this invention I have covered surfaces with a coating of finely-ground and pulverized calcined gypsum mixed with a percentage of glue and suspended and diluted in water, (this is shown in Patent No. 259,448, granted to me June 13, 1882,) and upon the surface so prepared I place an outer coating of paint. This has been found in practice to be a useful and economical mode of covering surfaces. The coating of the mixture of gypsum and glue adheres tenaciously to the surface to which it is applied, and forms a strong covering, which, though in itself not adapted to resist atmospheric influences, is capable of absorbing oil; but when the coat of paint is directly applied to it its capacity to absorb the oil deprives the paint of a part of its oil, and when the paint was applied directly to the coat of gypsum and glue it was impossible to ascertain to what extent the oil united with the under coat at every point. The application of oil alone or unmixed with paint directly to the calcined gypsum and glue obviates this difficulty and at the same time it forms a coating adapted in itself to protect the surface which it covers and to bear exposure to the weather as well as any other oil surface, and further, it forms an economical basis for a coating of paint or any similar or ordinary covering.

Methods of preparing and applying the coating of gypsum and glue are described in Letters Patent of the United States granted to me on the 6th day of April, 1875, No. 161,591, and also in Letters Patent of the United States granted to me on the 4th day of April, 1882, No. 255,937. The coating may be white or colored, according to the nature of the work desired, and after it is dry and set, which requires a very brief time, the coating of oil is applied directly upon it. The subcoat has an affinity for the oil or readily absorbs it, and when the oil is directly applied, and in an unmixed state, it is absorbed by the subcoat in all parts of the surface, or if any part fails to receive the proper amount this failure can be perceived and more oil applied to the part which may be lacking, which is not possible when the oil is applied in mixture with paint.

For some kind of work a coating of oil and subcoat of calcined gypsum and glue are sufficient. They are sufficient, for example, on wood-work, where it is desirable to preserve the appearance of the grain. For this kind of work I first apply the uncolored coat of the calcined gypsum and glue and cover this with oil, which strikes into the subcoat and leaves it transparent, with an oil-finish. After the coating of the calcined gypsum and glue has been applied it requires polishing or smoothing, and this may be done by means of sandpaper or pumice-stone in the same manner in which the ordinary subcoats are smoothed and polished; but from the nature of the material of which the subcoat in this case is composed the ordinary mode of smoothing and polishing produces a fine dust, which is detrimental to other work in the shop, and to avoid this disadvantage I have devised a mode of applying the oil simultaneously with the application of the sand-paper or the pumice-stone to smooth the surface. I rub the surface with oil and pumice-stone or sand-paper until the surface is reduced to a proper condition of smoothness and finish, and this leaves a very finely-finished surface without dust. As before intimated, this process alone forms a desirable and durable covering; but it also forms an excellent basis to receive an outer coat of paint or any similar covering, and for surfaces requiring such a covering—that is to say, for carriages, coaches, and the like—I apply an outer coating of paint, or any other desired outside finishing-coat.

I have found that a combined coat above described is better and more durable than a coat entirely of paint. The subcoat of gypsum and glue is advantageous as a first coat in the two particulars that it adheres strongly to the surface on which it is placed, and will not under any circumstances crack or peel, but remains hard and firm and clings strongly to the wood or other article. At the same time it receives and holds as strongly the oil or the oil and paint applied to it. The well-known rapidity with which the material of which this subcoat is composed sets and dries greatly facilitates the work of painting, and by the use of this material coaches or carriages may be painted completely in a few days, while the old mode requires weeks or months, with all the attending inconveniences of storage and loss of use of the vehicle. The under coat may be applied and prepared for the finishing-coat in one day.

I claim as my invention—

1. The improved process of covering surfaces, consisting in first applying a mixture of pulverized calcined gypsum and glue suspended in water, and when this is dry applying thereto a coat of oil or varnish, substantially as described.

2. The improved process of covering surfaces, consisting in first applying a mixture of pulverized calcined gypsum and glue suspended in water, and when this is dry in rubbing the same smooth in oil or varnish.

3. The improved process of covering surfaces, consisting in first applying a mixture of pulverized calcined gypsum and glue suspended in water, and when this is dry applying thereto a coat of oil or varnish, and finally applying a coat of paint over the oil or varnish, substantially as described.

4. The improved finish or covering for exposed surfaces, consisting of a subcoat of calcined gypsum and glue and a superficial coat of oil or varnish placed thereon, substantially as described.

5. The improved covering or finish for exposed surfaces, consisting of a subcoat of calcined gypsum and glue, a coat of oil laid next thereon, and a superficial coat of paint, substantially as described.

In testimony whereof I have signed my name to this specification in the presence of two subscribing witnesses.

MELVIN B. CHURCH.

Witnesses:
CHAS. L. STURTEVANT,
WALTER DONALDSON.